(12) United States Patent
Wang

(10) Patent No.: US 9,706,022 B2
(45) Date of Patent: Jul. 11, 2017

(54) EXTENSION KEY, ELECTRONIC EQUIPMENT AND CONTROL METHOD

(71) Applicants: HISENSE MOBILE COMMUNICATIONS TECHNOLOGY CO., LTD., Qingdao, Shandong (CN); HISENSE USA CORPORATION, Suwanee, GA (US); HISENSE INTERNATIONAL CO., LTD., Qingdao, Shandong (CN)

(72) Inventor: Xiaoxian Wang, Shandong (CN)

(73) Assignees: HISENSE MOBILE COMMUNICATIONS TECHNOLOGY CO., LTD., Qingdao, Shandong (CN); HISENSE USA CORPORATION, Suwanne, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 197 days.

(21) Appl. No.: 14/662,471

(22) Filed: Mar. 19, 2015

(65) Prior Publication Data

US 2016/0132133 A1   May 12, 2016

(30) Foreign Application Priority Data

Nov. 11, 2014  (CN) .......................... 2014 1 0631344

(51) Int. Cl.
*G06F 3/16*   (2006.01)
*G06F 3/01*   (2006.01)
(Continued)

(52) U.S. Cl.
CPC ............ *H04M 1/026* (2013.01); *G06F 3/016* (2013.01); *G06F 3/167* (2013.01); *H04M 1/236* (2013.01);
(Continued)

(58) Field of Classification Search
None
See application file for complete search history.

(56) References Cited

U.S. PATENT DOCUMENTS 3,960,045 A * 6/1976 Petrushevsky ......... G10D 11/02
84/376 SM
8,441,447 B2 * 5/2013 Tan ....................... G06F 1/1613
345/168

(Continued)

FOREIGN PATENT DOCUMENTS

JP        2-30023 A      1/1990

*Primary Examiner* — Antonio Xavier
(74) *Attorney, Agent, or Firm* — Boyle Fredrickson, S.C.

(57) ABSTRACT

The present disclosure discloses an extension key, electronic equipment and a control method. The extension key includes a shell, a stroke lever, a dome spring, a key body, a vibrating reed and a reset spring. The shell is provided with a sound output hole and a key surface hole; the dome spring is arranged above a first rotating arm; the key body is elastically supported by the dome spring and key surface stretches out of the key surface hole; the vibrating reed is arranged above a second rotating arm; when key body is pressed, the dome spring may deform instantaneously and stroke the first rotating arm, so that the second rotating arm strokes the vibrating reed; and when the press on key body is removed, the dome spring jacks the key body to reset, and the reset spring rotates the stroke lever to reset.

18 Claims, 2 Drawing Sheets

(51) Int. Cl.
  *H04M 1/02* (2006.01)
  *H04M 1/23* (2006.01)
  *H01H 13/85* (2006.01)
(52) U.S. Cl.
  CPC ......... *H01H 13/85* (2013.01); *H01H 2215/03* (2013.01)

(56) References Cited

U.S. PATENT DOCUMENTS

| | | | |
|---|---|---|---|
| 9,342,149 B2* | 5/2016 | Casparian | G06F 3/016 |
| 2004/0200699 A1* | 10/2004 | Matsumoto | H01H 13/702 |
| | | | 200/1 B |
| 2008/0018592 A1* | 1/2008 | Park | A63F 13/06 |
| | | | 345/156 |
| 2009/0210829 A1* | 8/2009 | Giacomelli | G06F 3/016 |
| | | | 715/858 |
| 2013/0114380 A1* | 5/2013 | Bryger | G06F 3/017 |
| | | | 367/199 |
| 2015/0300845 A1* | 10/2015 | Marquas | G01L 1/142 |
| | | | 324/662 |
| 2017/0011210 A1* | 1/2017 | Cheong | H04W 12/06 |

* cited by examiner

US 9,706,022 B2

EXTENSION KEY, ELECTRONIC EQUIPMENT AND CONTROL METHOD

CROSS-REFERENCES TO RELATED APPLICATION

This application claims priority to Chinese Patent Application No. 201410631344.2, filed with the Chinese Patent Office on Nov. 11, 2014, the content of which is hereby incorporated by reference in its entirety.

FIELD

The present disclosure relates to an extension key, an electronic equipment and a control method.

BACKGROUND

With continuous progress of science and technology, various mobile terminals (e.g., mobile phones, notebook computers, tablet personal computers and the like) have been rapidly developed. Taking mobile phones as an example, with continuous improvement of user needs, the structure, style, performance and the like of the mobile phones are increasingly updated frequently.

Generally, an earphone hole is arranged in standard configuration of a mobile phone, and an existing extension key may realize an extension function through the earphone hole. Specifically, a plug of the extension key is inserted into the earphone hole to realize an electrical signal connection with the earphone hole. When a user presses the extension key, the state of an elastic mechanism in the extension key is changed to trigger short-circuit or open-circuit of a certain pin in the extension key, so that the electrical signal is changed. When the extension key is set as a photographing shutter by a user, photographing may be performed by pressing the extension key in a photographing interface of the mobile phone.

SUMMARY

One aspect of the embodiments of the present disclosure provides an extension key, including a shell and a stroke lever, a dome spring, a key body, a vibrating reed and a reset spring which are arranged in the shell, wherein:
the shell is provided with a sound output hole and a key surface hole; the dome spring is arranged above a first rotating arm of the stroke lever; the key body is elastically supported by the dome spring and a key surface of the key body stretches out of the key surface hole; and the vibrating reed is arranged above a second rotating arm of the stroke lever;
when the key body is pressed, the dome spring may deform instantaneously and stroke the first rotating arm to enable the second rotating arm to stroke the vibrating reed; and when the press on the key body is removed, the dome spring jacks the key body to reset, and the reset spring rotates the stroke lever to reset.

Another aspect of the embodiments of the present disclosure provides a method for controlling an electronic equipment, including:
receiving, by electronic equipment, a sound signal which is different from a voice signal; and
generating, by the electronic equipment, an electrical signal to control the electronic equipment to execute a first instruction, in response to the received sound signal.

Another aspect of the embodiments of the present disclosure provides an electronic equipment, including a processor, a memory and a sound receiver, wherein the memory has computer-readable program codes stored therein, and the processor is configured to execute the computer-readable program codes to respond to a sound signal after the sound receiver receives the sound signal and then generate an electrical signal to control the electronic equipment to execute the first instruction; wherein the sound signal is different from a voice signal.

REFERENCE NUMBERS

1—extension key; 2—shell; 3—stroke lever; 4—dome spring; 5—key body; 6—vibrating reed;
7—reset spring; 8—sound output hole; 9—key surface hole; 10—first rotating arm; 11—second rotating arm; 12—double-sided adhesive tape;
13—stroke protrusion; 14—protruding portion; 15—adhesive tape; 16—first limiting structure; 17—second limiting structure;
18—folding arm part; 19—tip portion; 23—groove; 24—limiting protrusion; 25—upper tip; 26—lower tip; 27—blocking convex rib; 100—mobile terminal.

DETAILED DESCRIPTION OF THE EMBODIMENTS

To improve the operation convenience of an extension key and the use flexibility of a mobile terminal the embodiments of the present disclosure provide an extension key and a mobile terminal. In a technical scheme of the embodiments of the present disclosure, the extension key includes a shell as well as a stroke lever, a dome spring, a key body, a vibrating reed and a reset spring which are arranged in the shell. When the key body is pressed to enable a second rotating arm of the stroke lever to stroke the vibrating reed, the vibrating reed may generate a specific sound wave signal. After identifying the specific sound wave signal, an identification module of the mobile terminal can trigger a functional module of the mobile terminal to enter a preset operation state. Because the realization of the extension function of the extension key is independent of the earphone hole, this scheme greatly improves the operation convenience of the extension key and the use flexibility of the mobile terminal.

To make the purposes, technical schemes and advantages of the present disclosure more clear, the present disclosure will be further described in detail below through embodiments.

Figure 1:
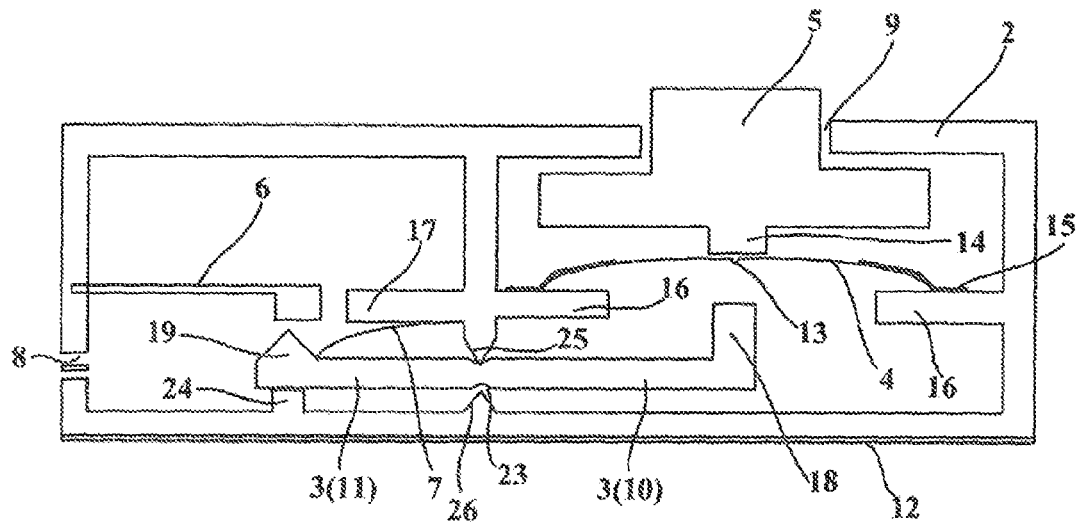
FIG. 1 is a schematic structural diagram of an extension key according to an embodiment of the present disclosure.

As shown in FIG. 1, an extension key disclosed by an embodiment of the present disclosure includes a shell 2, a stroke fever 3, a dome spring 4, a key body 5, a vibrating reed 6 and a reset spring 7, the stroke lever 3, the dome spring 4, the key body 5, the vibrating reed 6 and the reset spring 7 are arranged in the shell 2.

The stroke lever 3 includes a first rotating arm 10 and a second rotating arm 11; the shell 2 is provided with a sound output hole 8 and a key surface hole 9; the dome spring 4 is arranged above the first rotating arm 10 of the stroke lever 3; the key body 5 is elastically supported by the dome spring 4 and the key surface of the key body 5 stretches out of the key surface hole 9; and tire vibrating reed 6 is arranged above the second rotating arm 11 of the stroke lever 3.

When the key body 5 is pressed, the dome spring 4 may deform instantaneously and stroke the first rotating arm 10, to enable the second rotating arm 11 to stroke the vibrating reed 6; and when the press on the key body 5 is removed, the dome spring 4 jacks the key body 5 to reset, and the reset spring 7 rotates the stroke lever 3 to reset.

In this embodiment, the extension function defined by the extension key is not limited, e.g., the extension key may be used as a photographing shutter key, an MP3 automatic playing key, a phone get-through/hang-up key; an interface awaking key or the like.

Figure 3:
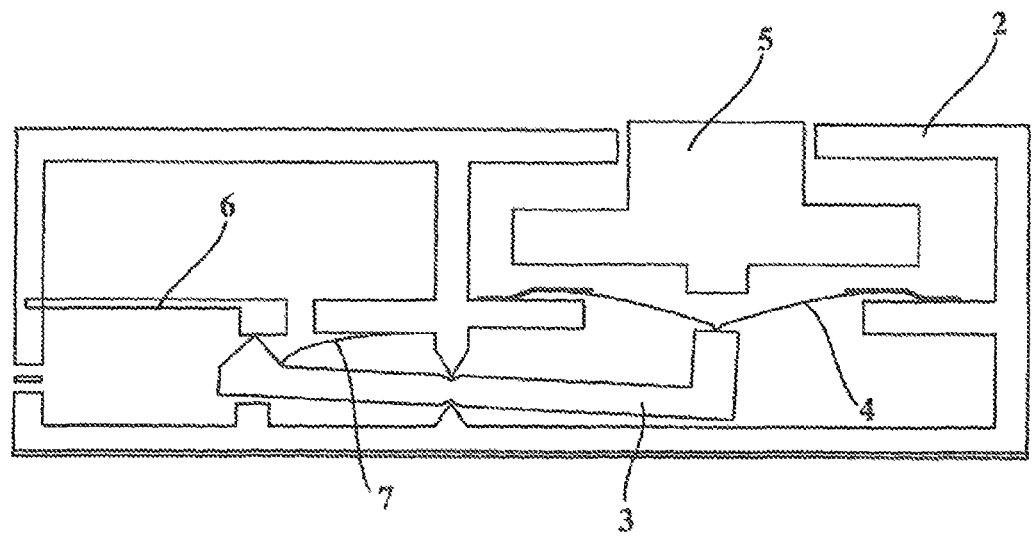
FIG. 3 is a schematic structural diagram of an extension key according to an embodiment of the present disclosure.

When the key body 5 is pressed, the dome spring 4 may deform under compression. With the accumulation of the deformation, the dome portion of the dome spring 4 may instantaneously sink and is lower than four sides (as shown in FIG. 3) of the dome spring 4, and the bottom, of the dome of the dome spring 4 strokes the first rotating arm 10, so that the second rotating arm 11 strokes the vibrating reed 6. After stroking, the reset spring 7 rotates the stroke lever 3 to reset, the vibrating reed 6 vibrates intermittently in the free space after being separated from the second rotating arm 11, and the vibration of vibrating reed 6 drives air to vibrate, so that the vibration is changed into a sound wave and the sound wave is propagated through air.

The sound wave produced by vibration of the vibrating reed 6 may be low-frequency-sound wave (the frequency of the sound wave is lower than 15 kHz, and the sound wave should be different from environmental sound wave) which may be heard by the human ear. In an embodiment, the vibrating reed 6 is a high-frequency vibrating reed, the frequency of the sound wave produced by vibration of the vibrating reed 6 is 15-22 kHz (belonging to high-frequency sound wave, the frequencies of sound wave produced by vibrating reeds with different weight, elasticity or thickness are different), and the reason is as follows.

Firstly, the sensitivity of the human ear to the high-frequency sound wave of which the frequency is 15-22 kHz is low, and the human ear hardly hears such sound wave, so the extension, key does not interfere with normal hearing of the human ear. Secondly, because the characteristic of a microphone is different from that of the human ear, the microphone still has strong capability of capturing the high-frequency sound wave of which the frequency is 15-22 kHz. Finally, because less sound in nature is within the high-frequency band, the identification module of the mobile phone may easily distinguish the high-frequency sound wave from the sound wave in nature, and the identification sensitivity and accuracy are relatively high.

The shell 2 is not limited to a specific shape, and may be in a square box shape or in other shapes coordinated with the shape of the mobile terminal. The sound output hole 8 is not limited to a specific position, and may be positioned, in the top wall or side wall of the shell 2. In an embodiment, in order to reduce dust, the sound output hole 8 may be formed in the side wall of the shell.

The specific configuration manners of the stroke lever 3, the dome spring 4, the key body 5, the vibrating reed 6 and the reset spring 7 in the shell 2 are not limited. For example, limiting position may be realized through an injection molding structure (such as a first limiting structure 16 and a second limiting structure 17 in FIG. 1) in the shell 2 or through other portions fixed in the shell 2.

In FIG. 1, a groove 23 is formed in each of the upper and lower sides of a fulcrum of the stroke lever 3, the injection molding structure in the shell 2 further includes a limiting protrusion 24, an upper tip 25 and a lower tip 26, and the upper tip 25 and the lower tip 26 cooperate with the corresponding grooves 23, so that the stroke lever 3 may rotate clockwise and anticlockwise around the fulcrum and is stopped at the limiting protrusion 24 when rotating anticlockwise.

Figure 2:
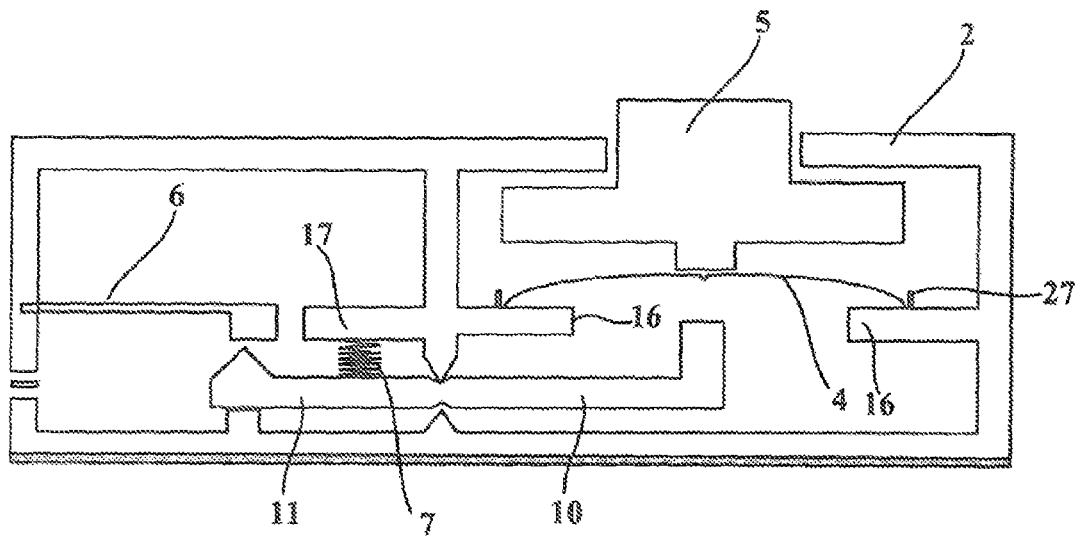
FIG. 2 is a schematic structural diagram of an extension key according to an embodiment of the present disclosure.

As shown in FIG. 1, the dome spring 4 is fixed on a first limiting structure 16 (in a broken bridge shape) in the shell 2 through an adhesive tape 15, and this fixed manner is simple and reliable, so that the structure cost is relatively low. As shown in FIG. 2, the dome spring 4 may also be blocked and limited by blocking convex ribs 27 of the first limiting structure 16.

The reset spring 7 may enable the stroke lever 3 to quickly rotate and reset, and may also avoid collision between the stroke lever 3 in a normal state (that is the dome spring 4 does not stroke the first rotating arm 10) and the vibrating reed 6. The type and installation position of the reset spring may be flexibly selected according to the space structure in the shell 2. As shown in FIG. 1, the reset spring 7 is a spring plate, and the spring plate is limited between the upper surface of the second rotating arm 11 and the second limiting structure 17 in the shell 2. As the spring plate is elastically supported between the upper surface of the second rotating arm 11 and the second limiting structure 17 in the shell 2, the installation is convenient and the structure is reliable. As shown in FIG. 2, the reset spring 7 may also be a spiral compression spring, and is elastically supported between the upper surface of the second rotating arm 11 and the second limiting structure 17 in the shell 2. Moreover, if the distance between the second rotating arm 11 and the inner bottom surface of the shell 2 is relatively long, a spiral tension spring for rotating and resetting the stroke lever may be arranged between the lower surface of the second rotating arm 11 and the inner bottom surface of the shell 2.

The key body 5, the stroke lever 3 and the vibrating reed 6 are not limited to specific shapes. As shown in FIG. 1, when the key body 5 is jacked by the dome spring 4, the key body 5 is stopped on the inner top wall of the shell 2, and the key surface of the key body 5 stretches out of the key surface hole 9. A protruding portion 14 opposite to the dome of the dome spring 4 is formed at the bottom of the key body 5. The contact area between the key body 5 and the dome spring 4 may be reduced by designing the protruding part 14, so that the stress of the dome spring 4 is relatively concentrated, the compressive deformation of the dome spring 4 is benefited, the pressing operation of the extension key is comfortable, and the sensitivity and accuracy during operation are relatively high.

It could be seen from FIG. 1 that, the arm length of the first rotating arm 10 is greater than that of the second rotating arm 11. It could be known from the lever principle that, the arm length of the first rotating arm 10 is relatively large, and the stroke travel is also large, so that the pressing operation of the extension key is comfortable, misoperation may be reduced, and the operation accuracy may be improved. Moreover, the first rotating arm 10 is provided with, a folding arm portion 18 opposite to the bottom of dome of the dome spring 4, and the second rotating arm 11 is provided with a tip portion 19 opposite to the stroke end of the vibrating reed 6. The second rotating arm 11 is in point contact with the stroke end of the vibrating reed 6, thus facilitating vibration and sound production of the vibrating reed 6.

Moreover, to ensure that the dome spring 4 accurately strokes the first rotating arm 10 during instantaneous deformation thereof, in an embodiment, a stroke protrusion 13 is formed at the dome bottom of the dome spring 4. The stroke contact between the stroke protrusion 13 and the first rotating arm 10 is in a point contact form, it could be understood that, the stroke protrusion 13 is slightly higher than the first rotating arm 10, so that the dome spring 4 quickly strokes the folding arm portion 18 of the first rotating arm 10 during instantaneous deformation. The stroke protrusion 13 is more favorable for deformation of the dome spring 4, so that the sensitivity and accuracy of stroking the first rotating arm 10 are improved.

Figure 4:
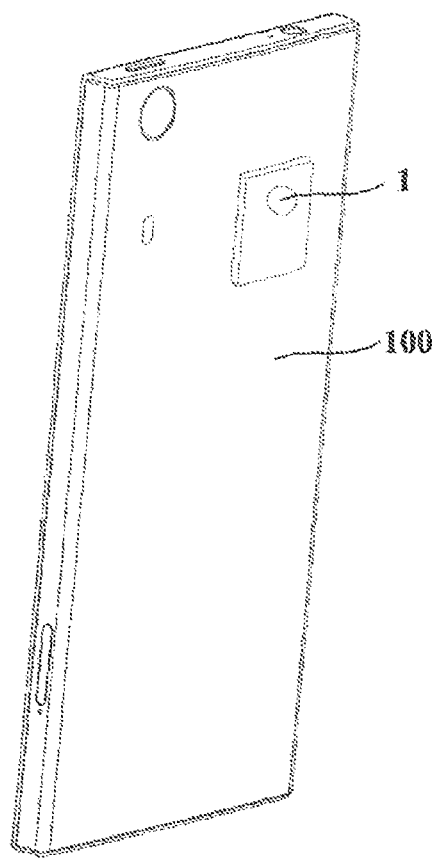
FIG. 4 is a schematic diagram shown that the extension key is fixed at a mobile terminal.

As shown in FIG. 1 and FIG. 4, in order to conveniently fix the extension key 1 with a mobile terminal 100, a double-sided adhesive tape 12 (the double-sided adhesive tape 12 may also be substituted by sucking discs) is fixed on the outer bottom surface of the shell 2. The extension key 1 is fixed on a housing of the mobile terminal 100 through the double-sided adhesive tape 12, so that the extension key 1 is convenient to detach and firm in fixing.

In the technical scheme of the embodiment of the present disclosure, when the key body 5 is pressed to enable the second rotating arm 11 to stroke the vibrating reed 6, the vibrating reed 6 may generate a specific sound wave signal. After identifying the specific sound wave signal, the identification module of the mobile terminal triggers the functional module of the mobile terminal to enter a preset operation state. Thus, the realization of the extension function of the extension key does not depend on the earphone hole, and the extension key may be fixed at any position of the housing of the mobile terminal by a user according to the use habit. Compared with the prior art, this scheme greatly improves the operation convenience of the extension key and the use flexibility of the mobile terminal.

The embodiments of the present disclosure further disclose a mobile terminal, including a microphone, a functional module and the extension key of any foregoing embodiment, wherein:
the extension key is fixed on a housing of the mobile terminal, and the vibrating reed of the extension key may generate a high-frequency sound wave signal when being stroked;
the microphone is configured to convert an environmental sound wave signal into an electrical signal;
the identification module is connected with the microphone through the electrical signal and configured to identify whether the environmental sound wave signal includes a high-frequency sound wave signal;
the functional module is connected with the identification module through the electrical signal and configured to enter a preset operation state when the environmental sound wave signal includes the high-frequency sound wave signal.

The use method of the extension key will be specifically described below, taking the extension key as a "photographing interface awaking key" and a "photographing shutter key" as an example.

The identification module of the mobile phone is enabled, the extension key is pressed according to a prompt button displayed on a mobile phone interface by the identification module, and then the vibrating reed of the extension key vibrates and generates a high-frequency sound wave signal. The microphone captures an environmental sound wave signal and converts the environmental sound wave signal into an electrical signal. The identification module analyzes the electrical signals corresponding to multiple times of pressing the key, and extracts the part having identical waveform data or frequency spectrum data as a reference sample. The identification module may display a function setting prompt on the mobile phone interface after successfully extracting the reference sample, and a user may set the extension function of the extension key as "first pressing for awaking a photographing interface" and "second pressing for photographing" at the moment.

After the above-mentioned process, when the user presses the extension key in a standby state of the mobile phone, the identification module may identify the high-frequency sound wave signal and then trigger a camera module to be turned on; and when the user presses the extension key again, the identification module identifies the high-frequency sound wave signal for the second time, and then the camera module may be triggered to photograph.

It should be noted that, if a user wants to configure a plurality of extension keys for a mobile terminal, the vibrating frequencies of the vibrating reeds (high-frequency vibrating reeds with different weight, elasticity or thickness may be selected) in these extension keys should be different to facilitate identification of the identification module. The user may set different extension functions for these extension keys, so that the function application of the mobile terminal is more flexible and diverse.

In the mobile terminal, the realization of the extension function of the extension key does not depend on the earphone hole, and the extension key may be fixed at any position of the housing of the mobile terminal by a user according to the use habit. Compared with the prior art, this scheme greatly improves the operation convenience of the extension key and the use flexibility of the mobile terminal.

Disclosed in an embodiment of the present disclosure is a method, the method is used for controlling electronic equipment, e.g., a mobile phone, a tablet personal computer, a television, a personal computer and the like, and the method includes the following operations:

Operation 1: the electronic equipment receives a sound signal, which is different from a voice signal.

For example, the electronic equipment is generally provided with a microphone or a component with similar function, so the sound signal may be monitored and received through the component like the microphone. Moreover, the sound signal here may be of a sound produced by interaction between objects or between an object and a user, so that the sound signal differs from a pure voice signal. For example, the sound produced by the interaction between the objects may be a sound produced by vibration when a certain structure acts on a certain component, e.g., a metal component impacts a metal sheet; and the sound produced by the interaction between the object and the user may be a sound produced by vibration when a hand acts on a certain component, e.g., the hand knocks a plastic sheet. In an embodiment of the present disclosure, the sound signal is produced by an object except the human.

The sound signal may come from a certain sound generator attached to the outer surface of the housing of the electronic equipment, e.g., the extension key mentioned, in the above embodiment. Of course, the sound generator may not be attached to the surface or periphery of the electronic equipment but handheld by a user, and then plays a role within a certain distance away from the electronic equipment. In an embodiment of the present disclosure, the sound signal comes from the outer surface of the electronic equipment, e.g., the surface of the housing of the electronic equipment, and sound is produced by collision or friction between the limb of a user and the surface of the housing of the electronic equipment.

In an embodiment of the present disclosure, the frequency of the sound signal, is within the hearing range of the human ear, e.g., 15-22 kHz.

In an embodiment of the present disclosure, the sound signal is identified after being received, to prevent misoperation caused by interference. For example, the sound signal may be identified through frequency, power and the like. Only the sound signal is identified successfully, subsequent processing is performed.

Operation 2: the electronic equipment responds to the received sound signal and generates an electrical signal to control the electronic equipment to execute a first instruction.

In an embodiment of the present disclosure, the first instruction may be any operation which, may be executed by the electronic equipment, e.g., screen lightening, call answering/hang-up, screen unlocking, screen locking, suspend/stop of audio and video playing, start and stop of wireless data transmission, switching of a silent mode, start of a photo mode, start of a photographing shutter, startup and shutdown and the like. Of course, the present disclosure is not limited to the switching operation of the two state modes, and may involve more complex operations, e.g., volume up and down, fast forward, and back of a player.

In an embodiment of the present disclosure, when the sound signals are signals organized according to a certain rule, the electronic equipment may record and store these sound signals, for example, the contents may be the signals acquired after sampling these sound signals or data acquired after analyzing these sound signals organized according to a certain rule, the present disclosure is not limited thereto, the contents acquired according to the sound signals are within the protection scope of the present disclosure. The sound signals may also be transmitted to other equipment through a network after being recorded, and the sound signals herein indicate themselves or contents acquired according to the sound signals. These sound signals may also be analyzed and output, e.g., output to a display screen or output through a loudspeaker and the like. The certain organization rule may be an organization rule of Morse codes in an embodiment of the present disclosure.

Disclosed in an embodiment of the present disclosure is an electronic equipment, including one or more processors, a memory and a sound receiver, wherein computer-readable program codes are stored in the memory; and the processors are configured, to execute the computer-readable program codes to respond to a sound signal after the sound receiver receives the sound signal, and then generate an electrical signal to control the electronic equipment to execute the first instruction: wherein the sound signal is different from a voice signal.

In an embodiment of the present disclosure, the memory may be a high-speed random access memory or a nonvolatile memory, e.g., at least one disk memory, a flash memory or other volatile solid state memories. Correspondingly, the memory may further include a memory controller, for controlling the processors and input equipment to access the memory. The sound receiver may be a microphone in an embodiment of the present disclosure, and may be configured to sample a sound signal and convert the sound signal into an electrical signal for subsequent processing.

The sound signal herein may be of a sound produced by interaction between objects or between an object and a user, so that the sound signal differs from a pure voice signal. For example, the sound may be produced by vibration when a certain structure acts on a certain component under the interaction between the objects, e.g., a metal part impacts a metal sheet; and the sound may be produced by vibration when a hand acts on a certain component under the interaction between the object and the user, e.g., the hand knocks a plastic sheet.

The first instruction may be an instruction combination or a single instruction.

For relevant contents in this embodiment reference may be made to the embodiment of the above method, which is not repeated herein.

An embodiment of the present disclosure further discloses a storage medium, which, includes computer-readable program codes and when these computer-readable program codes are executed, is configured to cause to receive a sound signal and respond to the sound signal to control certain electronic equipment to execute a first instruction.

For relevant contents in this embodiment, reference may be made to the embodiment of the above method, which is not repeated herein.

Obviously, various modifications and variations could be made to the present disclosure by those skilled in the art without departing from the spirit and scope of the present disclosure. Thus, provided that these modifications and variations made to the present disclosure are within the scope of the claims of the present, disclosure and equivalent technologies thereof, the present disclosure is intended to cover these modifications and variations.

The invention claimed is:

1. An extension key, comprising a shell and a stroke lever, a dome spring, a key body, a vibrating reed and a reset spring which are arranged in the shell, wherein:
   the shell is provided with a sound output hole and a key surface hole; the dome spring is arranged above a first rotating arm of the stroke lever; the key body is elastically supported by the dome spring and a key surface of the key body stretches out of the key surface hole; and the vibrating reed is arranged above a second rotating arm of the stroke lever;
   when the key body is pressed, the dome spring may deform instantaneously and stroke the first rotating arm to enable the second rotating arm to stroke the vibrating reed sp as to generate a sound signal; and when the press on the key body is removed, the dome spring jacks the key body to reset, and the reset spring rotates the stroke lever to reset.

2. The extension key of claim 1, wherein a vibrating frequency of the vibrating reed is 15-22 kHz.

3. The extension key of claim 1, wherein a double-sided adhesive tape or sucking discs are fixed on an outer bottom surface of the shell.

4. The extension key of claim 1, wherein an arm length of the first rotating arm is greater than that of the second rotating arm.

5. The extension key of claim 1, wherein a stroke protrusion is arranged at a bottom of a dome of the dome spring.

6. The extension key of claim 1, wherein a protruding portion opposite to a dome of the dome spring is arranged at a bottom of the key body.

7. The extension key of claim 1, wherein the dome spring is fixed on a first limiting structure in the shell through an adhesive tape.

8. The extension key of claim 1, wherein the reset spring is a spring plate, and the spring plate is limited between an upper surface of the second rotating arm and a second limiting structure in the shell.

9. The extension key of claim 1, wherein the first rotating arm is provided with a folding arm portion opposite to a bottom of a dome of the dome spring, and the second rotating arm is provided with a tip portion opposite to a stroke end of the vibrating reed.

10. A method for controlling an electronic equipment, comprising:
receiving, by the electronic equipment, a sound signal which is different from a voice signal, wherein the sound signal comes from a vibrating reed, triggered by pressing a key body, arranged in an extension key comprising a shell and a stroke lever, a dome spring, the key body, and a reset spring which are arranged in the shell; and
generating, by the electronic equipment, an electrical signal to control the electronic equipment to execute a first instruction in response to the received sound signal.

11. The method of claim 10, wherein the sound signal comes from an outer surface or periphery of the electronic equipment.

12. The method of claim 10, wherein a frequency of the sound signal is the one outside a hearing range of a human ear.

13. The method of claim 10, wherein the sound signal comes from interaction between a user and the electronic equipment.

14. An electronic equipment, comprising a processor, a memory and a sound receiver, wherein computer-readable program codes are stored in the memory, and the processor is configured to execute the computer-readable program codes to respond to a sound signal after the sound receiver receives the sound signal, and then generate an electrical signal to control the electronic equipment to execute a first instruction; wherein the sound signal is different from a voice signal, and the sound signal comes from a vibrating reed, triggered by pressing a key body, arranged in an extension key comprising a shell and a stroke lever, a dome spring, the key body, and a reset spring which are arranged in the shell.

15. The electronic equipment of claim 14, wherein the extension key is arranged in the electronic equipment.

16. The electronic equipment of claim 14, wherein the sound signal comes from an outer surface or periphery of the electronic equipment.

17. The electronic equipment of claim 14, wherein a frequency of the sound signal is the one outside a hearing range of a human ear.

18. The electronic, equipment of claim 14, wherein the sound signal comes from interaction between a user and the electronic equipment.

* * * * *